United States Patent
Schultz

[11] Patent Number: 5,124,086
[45] Date of Patent: Jun. 23, 1992

[54] FILL PACK FOR HEAT AND MASS TRANSFER

[75] Inventor: Martin Schultz, Hauset, Belgium

[73] Assignee: Munters Eurform GmbH

[21] Appl. No.: 762,249

[22] Filed: Sep. 19, 1991

Related U.S. Application Data

[63] Continuation of Ser. No. 533,380, Jun. 5, 1990, abandoned.

[30] Foreign Application Priority Data

Jun. 5, 1989 [DE] Fed. Rep. of Germany ....... 3918483

[51] Int. Cl.[5] ................................. B01F 3/04
[52] U.S. Cl. .................. 261/112.2; 261/DIG. 11; 366/338; 428/182; 428/185
[58] Field of Search ............. 261/112.2, DIG. 11; 428/182, 184, 185; 366/336, 337, 338

[56] References Cited

U.S. PATENT DOCUMENTS

| | | | |
|---|---|---|---|
| 3,216,494 | 11/1965 | Goodman | 261/112.2 X |
| 3,374,992 | 3/1968 | Greer | 261/112.2 |
| 3,738,626 | 6/1973 | Norback | 261/112.2 |
| 4,518,544 | 5/1985 | Carter et al. | 261/112.2 |
| 4,657,711 | 4/1987 | Wigley | 261/112.2 X |

FOREIGN PATENT DOCUMENTS

| | | |
|---|---|---|
| 36944 | 4/1982 | European Pat. Off. . |
| 177474 | 4/1986 | European Pat. Off. . |
| 1281457 | 10/1968 | Fed. Rep. of Germany . |
| 1287096 | 1/1969 | Fed. Rep. of Germany . |
| 1293796 | 4/1969 | Fed. Rep. of Germany . |
| 2113614 | 9/1971 | Fed. Rep. of Germany ... 261/112.2 |
| 2113614 | 12/1977 | Fed. Rep. of Germany ... 261/112.2 |
| 2921270 | 11/1980 | Fed. Rep. of Germany . |
| 8904345.6 | 6/1989 | Fed. Rep. of Germany . |
| 85386 | 6/1965 | France . |
| 1428875 | 1/1966 | France . |
| 1479375 | 5/1967 | France . |
| 1080991 | 8/1967 | United Kingdom . |

Primary Examiner—Richard L. Chiesa
Attorney, Agent, or Firm—Fitzpatrick, Cella, Harper & Scinto

[57] ABSTRACT

A fill pack for heat and mass transfer in counter-flow, in particular for the cooling of water in cooling towers by air, is provided. The fill pack includes a plurality of vertically or obliquely positioned corrugated or folded sheets or plates which are superposed and joined to each other in such a manner that the corrugations or folds of adjoining sheets cross each other only in the upper part of the fill pack, while the corrugations or folds of adjoining sheets are generally parallel to each other in the lower part of the fill pack.

7 Claims, 2 Drawing Sheets

FILL PACK FOR HEAT AND MASS TRANSFER

This application is a continuation of application Ser. No. 07/533,380, filed Jun. 5, 1990, now abandoned.

BACKGROUND OF THE INVENTION

A. Field of the Invention

The present invention relates to the field of fill packs for heat and mass transfer in counter-flow, in particular for the cooling of water in cooling towers by means of air, with a plurality of vertically or obliquely positioned corrugated or folded sheets or plates which are superposed and joined to each other and which are designed and/or superposed and joined to each other in such a manner that the corrugations or folds of adjoining sheets or plates cross each other.

B. Description of Prior Art

Such a fill pack or contact body is described in Federal Republic of Germany Patent No. 21 13 614. In the known fill pack, the corrugations or folds cross each other in adjoining layers at an angle of 45° or less, preferably 25° to 40°. The layers support each other and are glued to each other at the contact points by means of a suitable adhesive. Water and air flow in countercurrent through the fill pack. Continuous ducts are formed between the layers in the fill pack. These ducts are both horizontal and vertical and their width varies continuously between zero at the contact points between the layers and double the height of the corrugations or folds. The height of the corrugations or folds can be between 5 and 26 mm, preferably between 10 to 20 mm and the width of the ducts varies over the entire surface of the layers between zero and double the height of the corrugations or folds.

Such a crosswise arrangement of the corrugations or folds of adjoining sheets or plates or layers results in a turbulent flow of the gaseous medium in order to obtain adequate heat exchange rates. Because of the plurality of nodes between the corrugations or folds of adjoining layers throughout the entire fill pack, such fill packs or contact bodies have a relatively high tendency, however, to get fouled.

OBJECTS OF THE INVENTION

Therefore, it is an object of the invention to provide an improved fill pack.

It is also an object of the invention to provide a fill pack which, while its heat exchange rate is relatively high, does have a low tendency to get fouled.

A further object of the invention is to provide a fill pack having the corrugations or folds of adjoining sheets or plates cross only in the upper part of the fill pack, while in the lower part, the corrugations are parallel to each other.

Various other objects, advantages and features of the present invention will become readily apparent from the ensuing detailed description, and the novel features will be particularly pointed out in the appended claims.

SUMMARY OF THE INVENTION

According to this invention, in the upper part of the fill pack, the corrugations or folds of adjoining sheets or plates are in a crosswise arrangement. This crosswise arrangement creates in this area a turbulent gas flow which results in close contact with the liquid medium, so that adequate heat transfer is obtained in this area.

When fouling occurs in a multi-layered fill pack, however, it is invariably located in the lower part of the fill pack. In accordance therewith, the fill pack configuration of the present invention will enhance the acceleration of the water and thus the cleaning effect.

In contrast to the prior art, in the lower part of the fill pack, the corrugations or folds of adjoining sheets or plates or layers are generally parallel to each other. If the individual sheets or plates are in a vertical position, vertical ducts are therefore formed in this area which will accelerate the liquid flow and thus improve the washing action. In this area, the contact surface is essentially continuous and no nodes of corrugations or folds that cross each other are created. As a result thereof, the fouling tendency in this area is greatly reduced. In addition, the pressure drop for the gaseous medium is comparatively low.

If the entire height of the fill is considered, the fouling tendency is therefore less than for the aforementioned prior art, in which the corrugations or folds of adjoining layers intersect over the entire area of the fill pack. The invention assumes that the heat transfer achieved in the upper part of the fill pack is sufficient and satisfies the usual requirements. Previously, it was believed that in order to provide turbulent gas flow in the largest possible area of the fill pack, the largest possible area of the fill pack should include crosswise corrugations or folds.

According to the invention there can be a continuous or discontinuous transition of the corrugations or folds from the area where they cross each other to the area where they are parallel. In one preferred embodiment, the transition is continuous, as this ensures a smooth transition in the flow and discontinuities are avoided which also can cause fouling. If the corrugations and folds are straight, both in the upper and in the lower areas, the transition can, for example, be curved, in order to avoid creases in the corrugations or folds.

In another preferred embodiment of the present invention, the corrugations or folds of adjoining sheets or plates are curved in the plane of the sheet or plate, with the curvatures in adjoining sheets being in the opposite direction. This embodiment has a very favorable effect on the flow as there are, on the one hand, no discontinuities in the transition area, but as, on the other hand, the crosswise arrangement of the corrugations or folds of adjoining layers is ensured. A particularly favorable effect is achieved if the radius of curvature of the corrugations or folds decreases continuously in the direction toward the top edge of the fill pack. The crest of the corrugations or folds then forms, for example, a part of a logarithmic spiral which narrows in the direction toward the top edge of the fill pack. In this embodiment, the corrugations or folds of adjoining layers cross each other at a larger angle in the upper part of the fill pack than in the lower part. In other words, heat transfer is greatest in the upper part and slowly declines in the downward direction, while the velocity of the surface flow of the liquid increases in the downward direction.

It is advantageous if the measure of the curvature of the corrugations or folds over the height of the curved section is equal to the measure of the pitch of the corrugations or folds or to an integral multiple thereof. This type of embodiment ensures that at the top and bottom end of the curved section the troughs and the crests of adjoining layers are located exactly opposite each other, so that at these points corresponding entrance and exit cross sections are formed whose height is exactly equal to twice the height of the corrugations or folds, i.e. honeycomb-shaped openings.

In this preferred embodiment, the curvature of the corrugations or folds starts essentially at the bottom edge of the fill pack. As a result, the corrugations or folds of adjoining layers coincide at the bottom edge and diverge upwardly, starting from this point, with the opposite curvatures. At the bottom edge, the tangent to the curved crest of a corrugation or fold is therefore generally perpendicular to the bottom or upper edge of the fill pack.

It is advantageous to provide plane sections between adjoining corrugations or folds of a sheet or plate. In this embodiment, the nodes between the troughs of the corrugations of adjoining sheets or plates are therefore two-dimensional plane surfaces, so that adequate contact between the sheets or plates is assured.

The structure of the corrugations or folds of the sheets or plates may vary. In the preferred embodiment, the corrugations or folds are ribbed, with the ribs being generally perpendicular to the individual crests or troughs. This embodiment results in particularly close contact between the liquid and the gaseous medium.

BRIEF DESCRIPTION OF THE DRAWINGS

The following detailed description, given by way of example, and not intended to limit the present invention solely to the described embodiments, will best be understood in conjunction with the accompanying drawings in which.

DETAILED DESCRIPTION OF A PREFERRED EMBODIMENT

Figure 1:
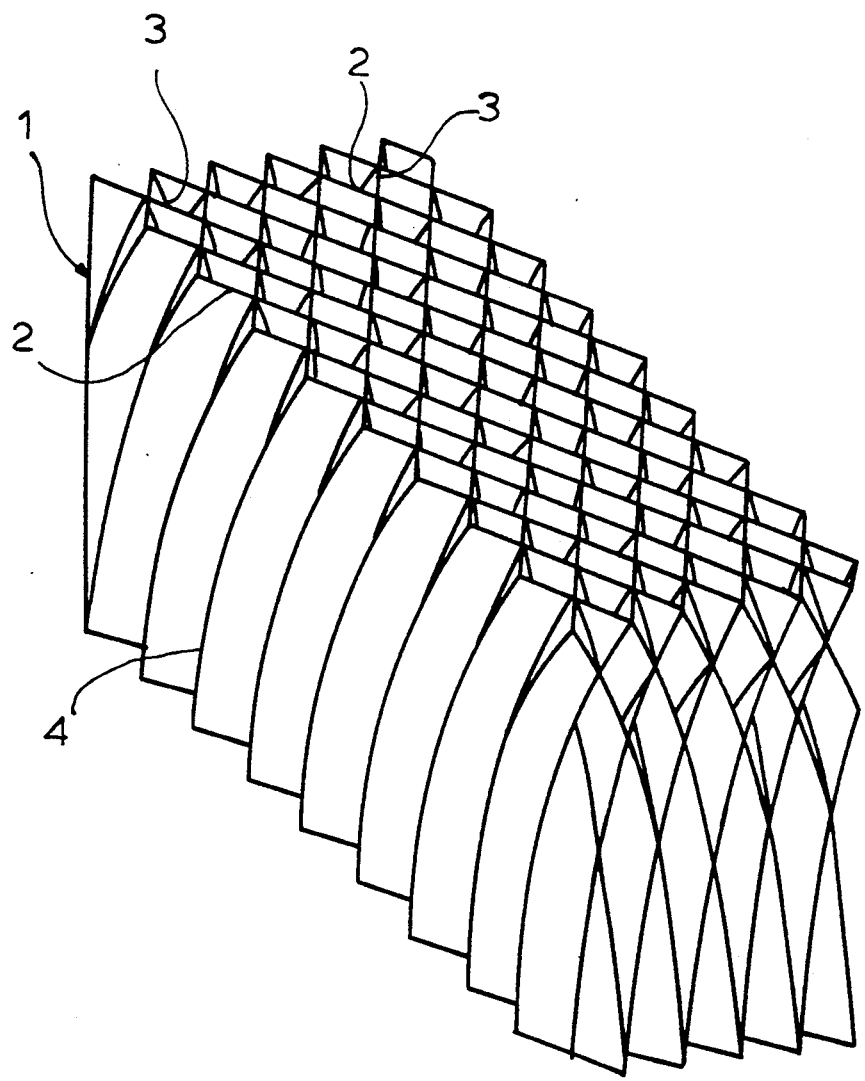
FIG. 1 is a front perspective view of a preferred embodiment of a fill pack in accordance with the present invention.

As shown in FIG. 1, fill pack 1 consists of a plurality of sheets 2, 3 made of a suitable plastic, which are attached to each other at their points of contact, for example with the aid of a suitable adhesive, so that a uniform, honeycomb-shaped structure is obtained. Each sheet is bellows-shaped and comprises a plurality of folds 4. Each fold 4 is formed by two oblique surfaces that meet and may have a suitable surface structure (not shown). The folds are curved, with the curvatures of adjoining sheets pointing in opposite directions (see FIG. 2). The folds of sheet 2, for example, which is the one in front in the illustration, are curved toward the right, while the folds of the adjoining sheet 3 are curved toward the left. The curvature, taken for the entire height of the fill pack, is equal to twice the measure of the pitch of the corresponding folds of the sheet, so that honeycomb-shaped openings are formed both at the top and at the bottom of the fill pack, which facilitate the entrance of the liquid and of the gaseous medium. The curvatures of the folds of adjoining sheets point in opposite directions, so that one obtains a stack of flow ducts crossing each other in the upper part of the fill pack, and the ducts make a transition to a generally parallel position toward the bottom end of the fill pack. The ducts are then generally perpendicular to the bottom surface of the fill pack.

Figure 2:
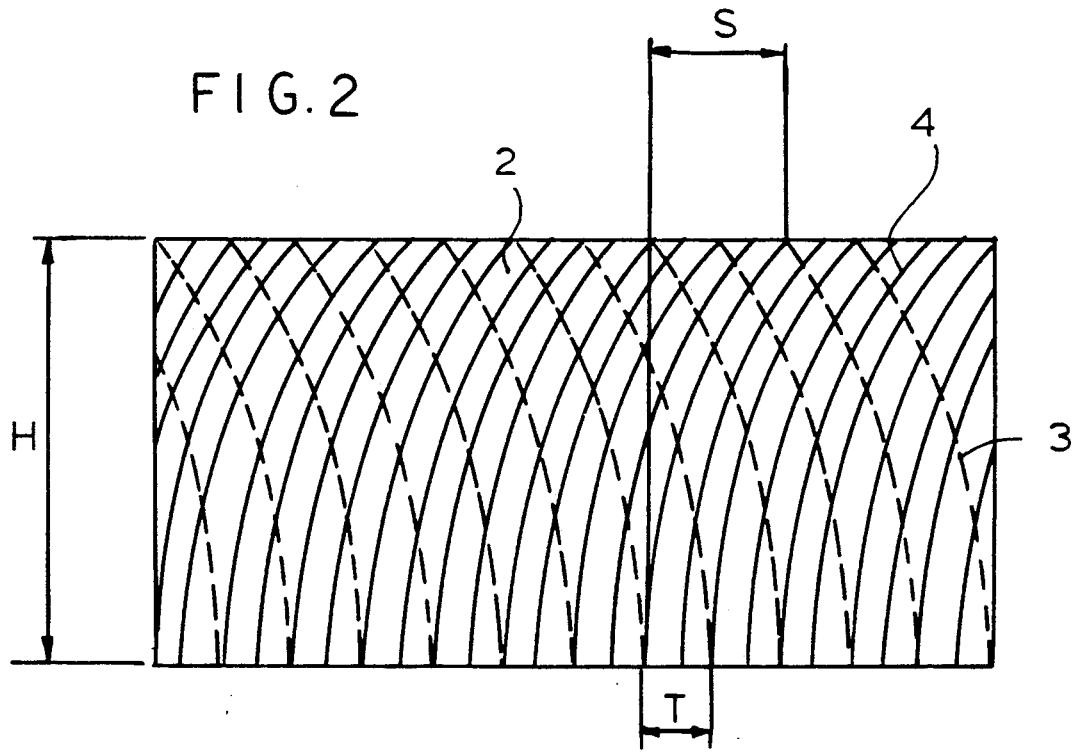
FIG. 2 is a side view of the fill pack of FIG. 1.

FIG. 2 shows the opposite curvatures of the folds 4 of the adjoining sheets 2 and 3. While the upper sheet 2 curves toward the right, as aforementioned, sheet 3, located below, is curved to the left. At the top of the fill pack, the measure of curvature S taken over the entire height H of the fill pack is equal to twice the pitch T (i.e. the distance between two adjoining folds).

In the preferred embodiments of FIG. 2, the radius of curvature of the folds 4 continuously decreases in the direction toward the top edge of the fill pack. Thus the crest lines of the folds form parts of a logarithmic spiral. At the bottom edge of the fill pack, the tangent to a crest is perpendicular to the edge of the fill pack.

Figure 3:
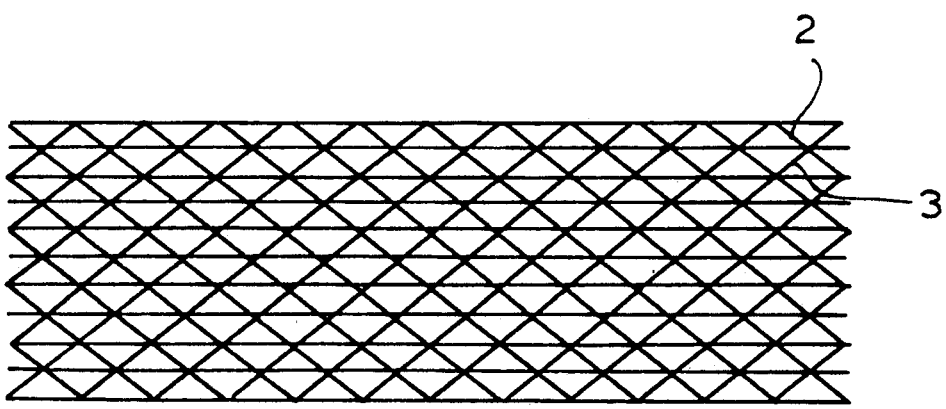
FIG. 3 is a top view of the fill pack of FIGS. 1 and 2.

FIG. 3 is a front view of a fill pack, with the honeycomb-shaped openings at the front end of the fill pack being specifically illustrated, which are formed by the folds in the adjoining sheets 2, 3.

The fill pack can be produced by making identically shaped sheets which are then placed on top of each other to form a stack. In so doing, every other sheet is turned around to obtain the opposite curvatures of the folds in adjoining sheets.

While this invention has been particularly shown and described with reference to a preferred embodiment, it will be readily appreciated by those of ordinary skill in the art that various changes and modifications may be made without departing from the spirit and scope of the invention. It is intended that the appended claims be interpreted as including the foregoing and other such changes and modifications.

What is claimed is:

1. A fill pack for heat and mass transfer in cooling towers by means of the counterflow of air and water, said fill pack having upper and lower surfaces and comprising a plurality of generally vertically obliquely positioned folded sheets which are superposed and joined directly to each other at points where the folds of adjoining sheets contact each other, said sheets having upper and lower portions with folds being generally straight in said lower portions and continuing therefor to said upper portions in a single continuous logarithmic curve arcing in one direction from its largest radius of curvature tangent to said straight portions of the folds to its smallest radius of curvature at said upper surface of the pack, whereby the folds of adjoining sheets cross each other only in the upper portion of the fill pack as defined by said upper portions of the sheets creating turbulence enhancing contact points between the sheets, with the folds being generally parallel to each other in the lower part of the pack as defined by said lower portions of the sheets where they abut against each other continuously along the crests of the folds, to create generally vertical tubes whereby the velocity of the water being discharged through the tubes is increased which thereby increases the self-cleaning effect.

2. The fill pack according to claim 1, wherein the folds of adjoining sheets are curved within the plane of the sheet, with the curvatures of adjoining sheets being in opposite directions to each other.

3. The fill pack according to claim 2, wherein the radius of curvature of the folds decreases continuously in the direction toward the top edge of the fill.

4. The fill pack according to claim 2, wherein the measure of the curvature of the folds over the height (H) of the curved section is equal to the measure of the pitch (T) of the folds or an integral multiple thereof.

5. The fill pack according to claim 2, wherein the curvature of the folds starts approximately at the bottom edge of the fill pack wherein a tangent to the fold at the bottom edge thereof is vertical and the folds curve continuously from that point in one direction to the upper surface of the pack.

6. The fill pack according to claim 1, wherein plane areas are provided between the adjoining folds of a sheet.

7. The fill pack according to claim 1, wherein the folds are ribbed.

* * * * *